US 7,216,292 B1

(12) United States Patent
Snapper et al.

(10) Patent No.: US 7,216,292 B1
(45) Date of Patent: May 8, 2007

(54) SYSTEM AND METHOD FOR POPULATING FORMS WITH PREVIOUSLY USED DATA VALUES

(75) Inventors: Erik J. Snapper, Kirkland, WA (US); Julian P. Jiggins, Seattle, WA (US); Bharat Shyam, Mercer Island, WA (US); Hadi Partovi, San Francisco, CA (US); Eric R. Berman, Woodinville, WA (US); Steven J. Freedman, Seattle, WA (US); James E. Allard, Seattle, WA (US); Frank Z. Chang, Redmond, WA (US); Stephen P. Proteau, Bothell, WA (US); Clint C. Jorgenson, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/388,351

(22) Filed: Sep. 1, 1999

(51) Int. Cl.
*G06F 15/00* (2006.01)
*G06F 17/00* (2006.01)

(52) U.S. Cl. .................. 715/507; 715/505; 715/506; 715/508; 715/780

(58) Field of Classification Search ............. 707/505, 707/506, 507, 508; 715/505–508, 500, 780; 345/811–812, 825
See application file for complete search history.

(56) References Cited

U.S. PATENT DOCUMENTS

| | | | | |
|---|---|---|---|---|
| 4,763,356 A | * | 8/1988 | Day et al. ............... 379/368 |
| 5,367,619 A | * | 11/1994 | Dipaolo et al. ......... 715/506 |
| 5,450,537 A | * | 9/1995 | Hirai et al. ............. 715/507 |
| 5,640,577 A | * | 6/1997 | Scharmer .............. 715/507 |
| 5,666,502 A | * | 9/1997 | Capps ................... 345/811 |
| 5,794,259 A | * | 8/1998 | Kikinis ................. 707/507 |
| 5,864,340 A | * | 1/1999 | Bertram et al. ........ 345/780 |
| 5,911,141 A | * | 6/1999 | Kelley et al. .......... 707/10 |
| 6,088,700 A | * | 7/2000 | Larsen et al. .......... 707/10 |
| 6,192,380 B1 | * | 2/2001 | Light et al. ............ 707/505 |
| 6,199,079 B1 | * | 3/2001 | Gupta et al. ........... 707/507 |
| 6,208,339 B1 | * | 3/2001 | Atlas et al. ............ 345/780 |
| 6,247,029 B1 | * | 6/2001 | Kelley et al. .......... 707/507 |
| 6,421,693 B1 | * | 7/2002 | Nishiyama et al. ..... 707/507 |

OTHER PUBLICATIONS

Introducing Microsoft Windows 95, 1995 Microsoft Corporation, p. 72.*
Geoffrey Hollander, Right Fielder snags field errors form mailing lists, InfoWorld, San Mateo: Feb. 2, 1998. vol. 20, Issue 5, pp. 1-3.*
"Background Of The Invention" of the above-identified pending U.S. patent application.
vCard: The Electronic Business Card document, version 2.1, Jan. 1, 1997, pp. 1-4.
Co-pending U.S. Appl. No. 09,388,353.

* cited by examiner

*Primary Examiner*—William Bashore
(74) *Attorney, Agent, or Firm*—Banner & Witcoff, Ltd.

(57) ABSTRACT

A system and method is provided for learning data values over time as they are entered by a user on a form such as a web page form. An Internet web browser can be modified to suggest previously used data values for any form field that is the same as or similar to a previously used form field. Application programs that use the web browser can gain access to previously used form field values even if they have no knowledge of the field names. Software in a web browser associates field names across different Universal Resource Locators (URLs), so that when a user enters a value into a field (e.g., username) at a first web site, that same value can be automatically suggested when the user displays a different form on a different web site that uses the same field name.

3 Claims, 7 Drawing Sheets

| First Name | J | | Last Name | |
| --- | --- | --- | --- | --- |
| | Jennifer | | | |
| Email | Jessica | | | |
| | James | | | |
| Street | ☐ Don't remember this | | Zip | |

| Login Name | Password | |
| --- | --- | --- |
| B | | Enter |
| Bill | Frames ⊙ My Default | |
| ✗ | rd? | Use my Default |
| V I S I T O R S | I N F O | |

SYSTEM AND METHOD FOR POPULATING FORMS WITH PREVIOUSLY USED DATA VALUES

TECHNICAL FIELD

This invention relates generally to computer-implemented processing of data entry forms, such as Internet web pages containing form fields. More particularly, the invention provides a method and apparatus for automatically populating data fields in forms across different applications and web sites using data values previously entered by a user.

BACKGROUND OF THE INVENTION

Computer systems conventionally display forms with fields into which a user enters information such as a name, birth date, password, and the like. Modern Internet browsers display forms by rendering Hyper Text Markup Language (HTML) on web pages to generate fields that can be populated by a user. Web sites that accept shopping orders from on-line customers, for example, generate forms requiring that a customer enter the customer's name, address, telephone number, and credit card information. Usually, the user must repeatedly enter this information each time the site is visited. Although information entered by the user is stored on the web site, the form does not retain the information for future use if the web site is revisited.

Some web sites can recognize previous customers and thus avoid re-prompting for the same information on a subsequent visit. Nonetheless, if the user visits a new web site that he or she has never before visited, the same information must be re-entered on a different form generated by the different web site. Much of the information requested on these forms is redundant or readily available from other sources (e.g., name, address, date of birth), yet the creators of different forms generally have no easy way to share information previously entered by the user on an earlier form. Privacy issues have thwarted many potential solutions to this problem, and it is cumbersome for web site designers to include special logic on their web site to recognize previous visitors to the site.

So-called "cookies" (small data files stored by a web site on the user's local computer) are sometimes used to retain information locally that can be recalled later by a web site that the user has previously visited. Such "cookies," however, vary widely from site to site, and require cumbersome programming logic on each web site to implement them. Moreover, users can block the storage of these cookies, and users may be generally suspicious of their use by untrusted web sites. In addition, conventional web browsers will not transmit a given cookie to web servers with different secondary domains (e.g., a cookie written by a.com will not be shared with a server from b.com).

One attempt to solve some of these problems was a prior art feature embedded in the Microsoft Internet Explorer 4.0 product known as a "profile assistant." This feature made it easier for web sites to retrieve registration and demographic information from users who had previously provided that information. Frequently used information such as user name, address, and the like was stored securely in protected storage on the client computer. Web servers could request to read this information, but it was shared only if users gave their consent in a pop-up request box each time a site was visited. While the profile assistant provided a potential solution to the aforementioned problems, in practice it has not enjoyed widespread success. For example, it required that each web site write script to request information from the user's stored information. If the user declined to grant permission to share the information, the solution was effectively thwarted. Moreover, the solution was limited to certain predefined fields that were commonly used across different web sites, with no easy way to add new fields. It was also inconvenient and time consuming for the user to complete a full profile and store it on the user's machine. Finally, some users viewed the function as intrusive because it required immediate user input to confirm that the feature should be enabled each time a web site was visited.

A prior art data schema known as the "vCard" schema has been used for certain frequently referenced data fields across application programs. This schema established certain standardized field identifiers that were to be used for the same data fields, and was intended to facilitate the transfer of personal profile information among applications. For example, the following is an example of a vCard:

begin:vcard n:Doe, John tel;cell:415 555 1212 tel;fax:415 555 1212 tel;work:415 555 1212 x-mozilla-html:FALSE org:One & Co.

version:2.1 email;internet:cathy@oneandco.com adr;quoted-printable:;;247 4th St. #105=0D=0A;Oakland; Ca.;94607;USA x-mozilla-cpt:;;3 fn: John end:vcardwas

Using this schema, specific fields can be identified regardless of the form or application program into which the user's name was to be entered. (The user would most likely only see a label such as "First Name.") This schema does not, however, solve the aforementioned problems. As one example, it is difficult to force millions of web sites to conform to standard field identifiers or to retrofit existing web pages to the existing schema. Moreover, as new fields are introduced, universal agreement must be reached on what those fields represent and what their identifiers will be.

The prior art provides tools to suggest previously used values to a computer user when prompting the user for information. For example, some e-mail programs suggest possible recipient names in the "to" field which match previously stored user names. When the user types the first character of a recipient's name, a possible choice that matches the first character appears in the field. As another example, well-known Internet browsers provide a user with a pull-down menu of choices in an Internet browser address field, such that the user can review previously used web site addresses in order to select an address.

These conventional techniques, however, suffer from many of the same disadvantages as the aforementioned solutions. The application program itself (i.e., the e-mail program) must be specially modified to support the feature, and previously used field values cannot be shared among other application programs on the same computer unless those applications are also modified. Moreover, all application programs would need to adopt standard field identifiers in order for the scheme to work properly.

Internet web pages containing form fields create special problems, because each web site defines the format and behavior of its own forms, and there is no easy way to share or suggest previously entered data values across different web sites or servers. Moreover, because of privacy concerns, sharing previously entered form values for different web sites may be undesirable or even impossible in many cases.

In summary, user interfaces such as those provided by application programs and web-based forms frequently request the same or similar information from a user. Challenges posed by this problem include: (a) determining how to decrease redundant data entry across form fields (whether the same form or a different form containing a common field); (b) decreasing the redundant data entry without requiring changes to the forms themselves; (c) encouraging the adoption of standard field descriptors across applications, web sites and web pages; and (d) preventing unauthorized access to information that has been entered by a user.

SUMMARY OF THE INVENTION

The present invention overcomes many of the foregoing problems by providing a method and apparatus for learning data values from a user over time as the user enters values into fields on a form such as a web page form. In one embodiment, an Internet web browser includes code that that suggests previously used data values for any form text field that is the same as or similar to a previously used form text field. This feature can take advantage of the fact that web page authors frequently use the same or similar names for fields when prompting for the same information (e.g., "phone" when requesting a telephone number). Any browser-based application program (or any form retrieved from a web site using the browser) can gain limited access to previously used field values without compromising security or privacy. The invention can be implemented without modifying any of the application programs or web sites that contain forms.

In one embodiment, software in a web browser associates field names across different Universal Resource Locators (URLs), so that when a user enters a value into a field (e.g., username) at a first web site, that same value can be automatically suggested when the user displays a different form on a different web site that uses the same field name. The more web sites that are visited by the user, the more the software learns field values and is able to suggest likely choices for field values. For security reasons, field values are preferably not stored in the application program or on the target web site, but are instead stored locally on the client computer or at a trusted web site known to the browser.

Some embodiments of the invention prevent web sites from surreptitiously discovering suggested values by forcing the user to initiate some action (e.g., hitting a key or clicking a mouse) before a data value for a field is suggested, and by only writing data into the field when the user has selected one of the suggested values. Certain field values (e.g., passwords and credit card numbers) can be treated differently for even more security.

Heuristics can be used to identify and suggest values for fields. For example, a "most frequently used" value for a particular field can be suggested as a first choice rather than the last used value. Additionally, synonyms can be provided to correlate similar field names (e.g., "name," "username," "your name," etc.) across different forms. Bayesian inference functions can also be used to help match previously entered data values across different field names.

The principles of the invention can also be used to share data across browser-compatible applications. For example, the user of a newly created application that requires entry of a zip code would automatically be provided with a suggested zip code that was previously used with a totally different application weeks earlier, even though the newly created application had no knowledge or special code to handle previously entered values.

The invention can also be made compatible with the existing vCard schema standard, such that standard fields in that schema (e.g., vCard.Email) are correlated with fields on different forms. Previously used form field values can be stored in a protected storage area to protect them from snooping. In one embodiment, previously used field values can be can stored at a predetermined trusted web site, such that a user could access the previously used values even when using a different computer (e.g., a home computer instead of the office computer).

DETAILED DESCRIPTION OF THE INVENTION

Figure 1:
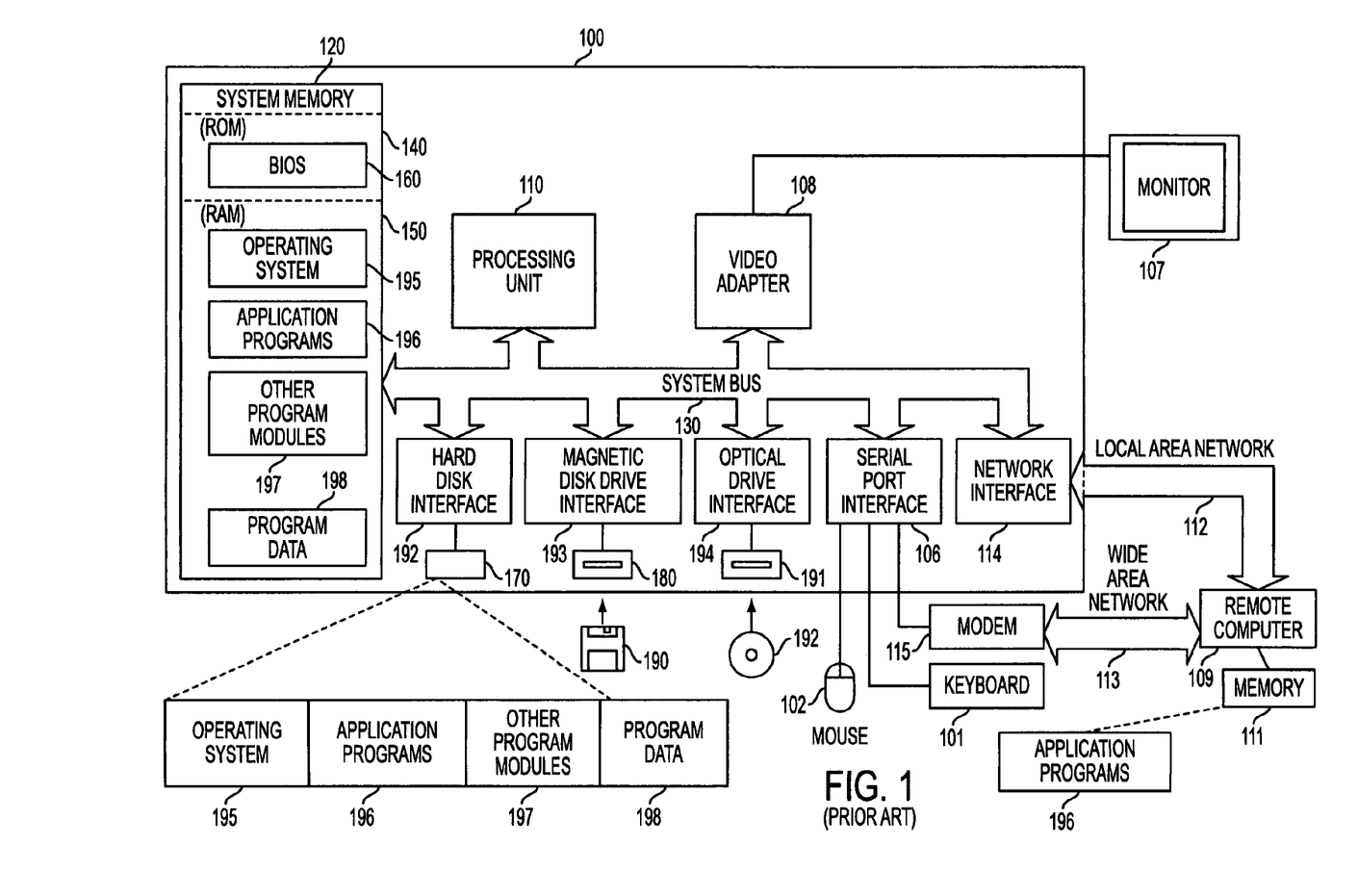
FIG. 1 shows a conventional general-purpose computing environment that can be employed in various embodiments of the invention.

FIG. 1 is a schematic diagram of a conventional general-purpose digital computing environment that can be used to implement various aspects of the invention. Computer 100 includes a processing unit 110, a system memory 120, and a system bus 130 that couples system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. Any of the inventive principles described herein can be implemented in software and stored on any of the aforementioned storage devices.

A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
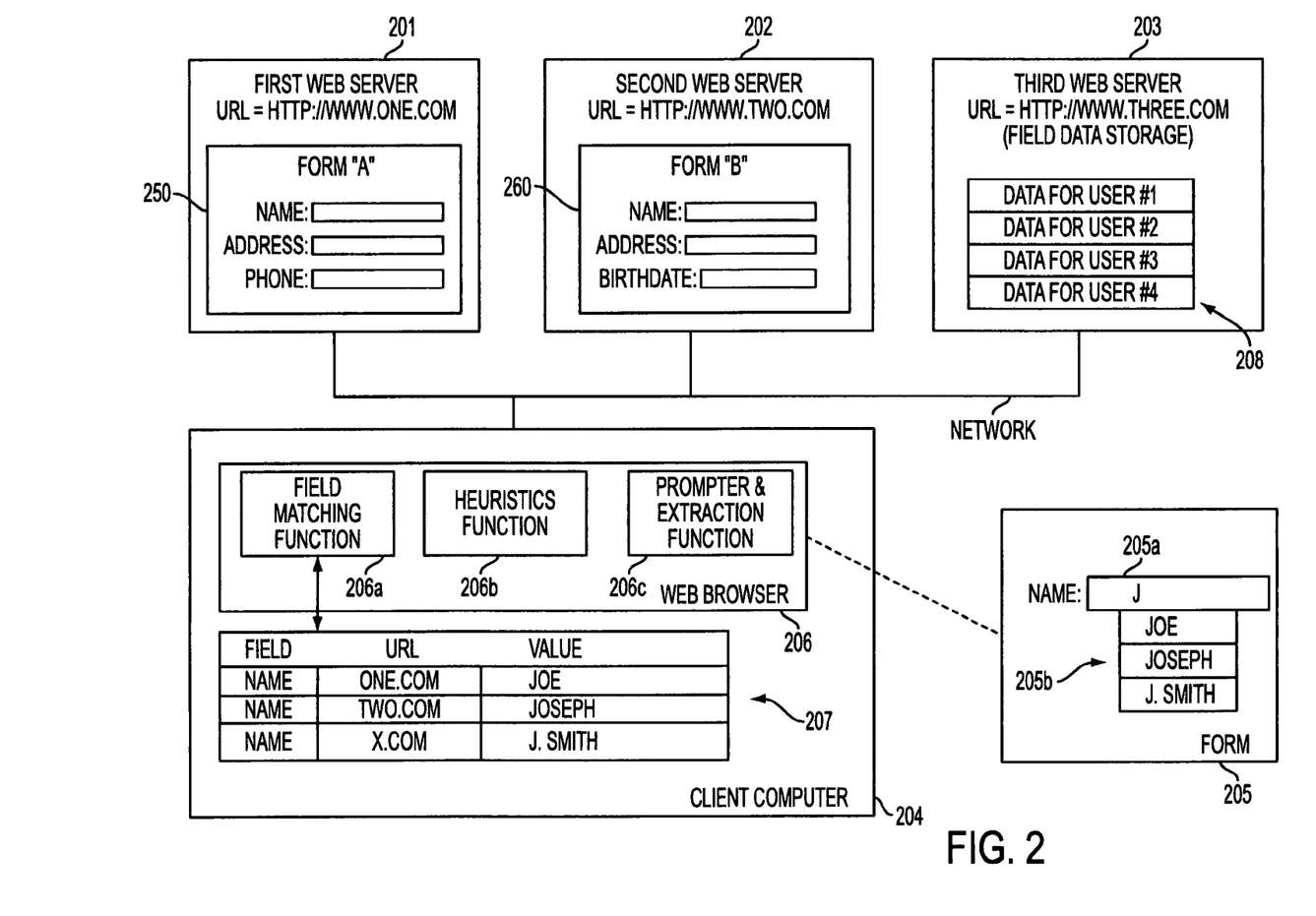
FIG. 2 shows a distributed web-based system employing various principles of the invention.

FIG. 2 shows a web-based distributed system employing various principles of the present invention. As shown in FIG. 2, a client computer 204 is coupled to a first web server 201, a second web server 202, and a third web server 203 through a network such as the Internet. Client computer 204 includes a conventional web browser 206 that has been modified in accordance with the principles of the present invention. As is conventional, the user of client computer 204 can retrieve web pages from web servers through the Internet using HTTP protocols, and can display web pages using HTML syntax. Application programs that operate within the context of modified web browser 206 will automatically obtain the benefits of the inventive principles described herein without modification. Alternatively, any application program can be created or modified to operate according to the inventive principles.

As shown in FIG. 2, each web server has associated therewith a Universal Resource Locator (URL) that uniquely identifies the server to client computers on the Internet. For illustration purposes, first web server 201 has a URL of www.one.com; second web server 202 has a URL of www.two.com, and third web server 203 has a URL of www.three.com. Web servers are sometimes referred to as "web sites," and those terms are used interchangeably herein. Each web site may contain one or more web pages that can be linked and retrieved using conventional protocols.

One type of web page permits data to be entered using form fields. As shown in FIG. 2, web site 201 includes a first form 250, and second web site 202 includes a second form 260. Each form includes a plurality of data entry fields that include a field label (e.g., name, address, phone), a field identifier (usually hidden from view), and a corresponding display region into which the user can type information when the web page is displayed using a conventional web browser. For example, an on-line shopping service may require that a customer enter his name, address and telephone number to process an order. Similarly, a government agency may require that a citizen enter his or her name, address, and date of birth. The field label corresponds to what the user will actually see on the display, while the field identifier or field name is frequently not displayed but permits an application program or web browser to identify the field. For example, a field label for a user's name might be displayed as "NAME," while the field identifier, visible to only the underlying software, might be "user_last_name." Of course, it is possible to use the same value for the field label and the field identifier, and it may also be possible to use one without the other, as long as the field can be identified.

As shown in FIG. 2, forms 250 and 260 require overlapping information; namely, the name and address of the person filling out the form. After the user has entered data into the fields, web browser 206 submits the form with the entered values to the web site from which the form was generated. Some web sites employ "script" executed by browser 206 to perform various functions on client computer 204 in connection with the processing of forms.

In accordance with one aspect of the present invention, data values entered by the user are extracted and stored for future use with different forms having fields with the same or similar identifiers. For example, the first time that the user of client computer 204 visits web site 201 and enters his name, address, and telephone number into form 250, modified web browser 206 associates the values entered by the user with the field identifiers and the URL for the web site and stores them into a data structure 207 for future use. Consequently, when the user visits different web site 202 and displays form 260, modified web browser 206 recognizes that some of the field identifiers used in form 260 are the same as or similar to field identifiers associated with a previously used form, and the values associated with those fields are retrieved and suggested to the user at the time he or she begins to fill out form 260.

Various techniques for prompting the user with suggested form field values are possible, and the invention is not intended to be limited to any particular approach. As shown in FIG. 2, one possible technique involves displaying a "pop-down" or "drop-down" list 205b below a field data entry region 205a after the user types a first character in the field. For example, assuming that the user has displayed form 205 on client computer 204 containing a field identified as "name," the user begins by typing "J" to start his name, Joe Smith. Immediately after the letter "J" is received in the form field, web browser 206 displays pop-down list 205b suggesting previously used values for fields having the same or a similar name. The user can move an up/down arrow key or mouse to select from the various choices, and can press a key such as the return key to consummate the selection. It will be appreciated that the list can be displayed "up" or "sideways" instead of "down" as illustrated, and those variations are expressly within the scope of the term "pop-down" as used herein.

As shown in FIG. 2, the exemplary user has previously visited three web sites: one.com, two.com, and x.com, and at each site has entered a value in a field identified as "name." Upon entering a value in the field identified as "name" at each site, modified web browser 206 stores in data area 207 a record of the value used, the field identifier, and the URL of the web site on which it was entered. Consequently, when the user again displays a form with the field identified as "name," modified web browser 206 recognizes the matching field identifier from previously visited web sites and suggests to the user the previously used values.

Modified web browser 206 may comprise any of a number of presently available web browsers that are modified in accordance with the inventive principles described herein. Many different approaches are of course possible, depending on the type of web browser and the design features available for the browser. One possible set of functions in the modified browser includes a field matching function 206a, heuristics function 206b, and a prompter and extraction function 206c.

Briefly, field matching function 206a searches through data store 207 when a field is selected to locate matching (identical or closely related) field identifiers, corresponding URLs, and previously used field values according to one or more heuristics determined by heuristics function 206b. (Matching by URLs may not be necessary or desirable in all cases, as explained below). After the user has entered a value for a field or selected a previously used value, field matching function 206a stores the value into data store 207 for future use, along with the URL and field identifier.

Heuristics function 206b can be employed to generate suggestion lists according to various heuristics that can optionally be user-controlled. For example, suggestions can be displayed in priority order based on the source from which they were obtained; by most-recently-used values; by similarity of field name or URL; or any other measure desired. Various heuristics are described in more detail with reference to FIG. 6.

Prompter and extraction function 206c generates and displays prompt list 205b according to the first letter typed in by the user, and stores values entered by the user into data store 207. One reason for requiring that the user type a first letter (or click a mouse button or make some similar user input) before any data values are released to the form (e.g., copied into data entry region 205a) is that a nefarious web site operator may be able to extract data values from data entry region 205a as soon as data is present in the region, which might cause suggested values (e.g., a telephone number) to be surreptitiously captured even if the user chooses not to enter a value into the field. For example, script on a web page could insert a character, wait for a change notification, and try to discern what suggested values were provided. Nonetheless, it is not necessary to implement the feature in this manner and it is of course within the scope of the invention to provide a suggestion list or suggested value without input at all by the user. Other variations on this approach are described in more detail below. Requiring a mouse click or key press would not require that the user navigate through the form using the mouse.

The values in data store 207 can be stored in encrypted form in a protected area in client computer 204. As explained in more detail herein, the values can be correlated or combined with data from other sources, such as values used by the profile assistant, an entry for the user in an operating system address book, commonly used field identifiers, or field names from the vCard schema.

Instead of storing data values in area 207, previously used form data values can be stored on a trusted web site known to browser 206 or selected by the user. As shown in FIG. 2, for example, web site 203 contains a storage area 208 for storing previously used data values for a plurality of users. This feature would permit a user that has both a home computer and an office computer to automatically be prompted with field suggestions that were made from either computer. In other words, web browser 206 would know (based on the log-in name, for example) that the user's previously stored data values on web site 203 should be used to suggest form values, even if the user had never previously used client computer 204 to enter data on any forms.

Figure 3:
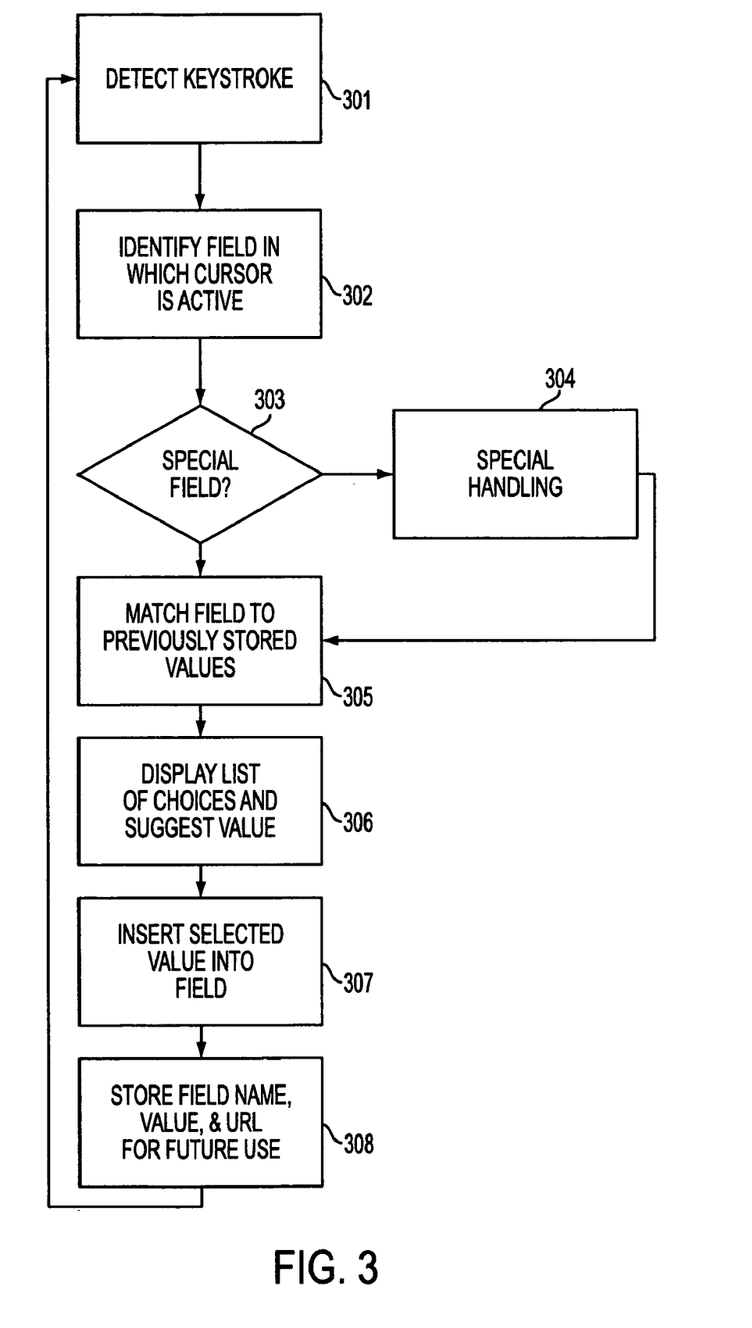
FIG. 3 shows various steps that can be performed in accordance with one or more embodiments of the present invention.

Reference will now be made to FIG. 3, which shows various steps that can be performed for carrying out the principles of the present invention. It is assumed that the user has selected a form for display (e.g., an HTML-compatible web form, or an application form on which multiple fields are displayed), and has placed the cursor in one of the fields on the form. It is also assumed that these steps are performed in conjunction with modified web browser 206 such as that shown in FIG. 2, or a similarly modified application program on a client computer. It will be appreciated that although the steps are shown in sequential order, the inventive principles can be carried out using object-oriented programming techniques with event-driven processing.

In step 301, processing begins when the user hits a key, such as typing the first character of a field value, or by hitting the space bar or down arrow. For example, if the field is "name" and the user's proper name is "Joseph," the user could hit the "J" key on the keyboard. Upon detecting a keystroke, software identifies the field in which the cursor is active (step 302). In step 303, a determination is made as to whether the field is one of a special category, such as passwords, credit card numbers, and the like. If so, then special handling is performed in step 304, which may cause some or all of the remaining steps to be skipped for that field. (See detailed description below with reference to FIG. 6).

Assuming that no special handling is required for the field, then in step 305 the field identifier for the field in which the cursor is active is matched to previously stored values for the same or a heuristically similar field to identify a list of one or more potential matches. As explained previously, this field matching step may encompass identifying the most recently used value for an identically named field or a similarly named field, and may generate one or more values used for different web sites, as illustrated in FIG. 2. Other matching techniques are possible; some of these are described below with reference to FIG. 6.

In step 306, a list of possible choices is displayed to the user, preferably but not necessarily in a pop-down menu list of the type shown in FIG. 2. Additionally, a "best match" choice can be suggested in the field display area 205a (FIG. 2), overwriting the user's solitary keystroke with the suggested field value (i.e., replacing "J" with "JOSEPH"), or it may be placed at the top of a list of suggested values.

In step 307, the user selects a value from the list of choices by indicating that the suggested value is correct, or by navigating down the list of choices using a mouse, up/down arrow, or other similar technique. (If none of the suggested choices is correct, the user will enter a new value into the data entry region 205a). Or, the user could continue typing, with the list being refreshed after each pause in the user's keystrokes. (Although not specifically shown in FIG. 3, as the user continues to type, the list can be refreshed between steps 306 and 307 to display choices matching the additional characters typed). After the user has selected or entered a value, the field identifier, the selected value, and the URL of the web site (if applicable) for the presently displayed form is stored for future use, such as in data store 207 of FIG. 2. Thereafter, the user navigates to the next field and processing begins on that field in step 301. Other features can also be provided, such as automatically resizing the list of choices to accommodate an ideal width and height for the choices displayed, and tying the list to the page so that if the user scrolls the page the list scrolls with the page.

It will be appreciated that there are many different ways of implementing the steps described above. For example, it is not necessary to require that the user hit a key before suggesting possible choices and inserting a data value into the field. However, as explained previously, requiring such a keystroke or other user-initiated action (such as voice input or the like) to prevent script on the page from impersonating the user may provide better security. Moreover, there are many ways of permitting the user to select choices and navigate among fields, such as using a tab key, up/down arrows, mouse clicks, and the like. Moreover, it may be desirable to give the user additional choices, such as affirmatively indicating whether a particular field value should be stored for future use.

FIGS. 4A through 4D show several different techniques for prompting a user with possible field values, selecting one of the values, and storing the selected value for future use.

Figure 4A:
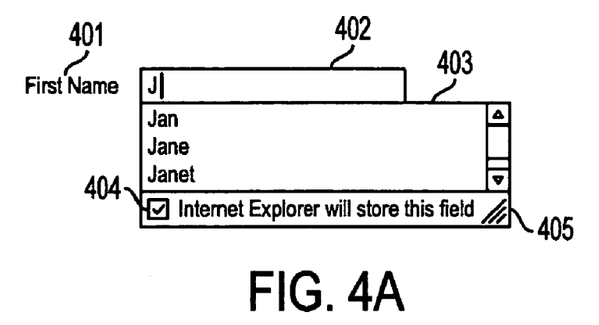
FIG. 4A shows one possible technique for displaying a list of choices for a field data value and selecting one of the displayed choices.

Beginning with FIG. 4A, a portion of a form is shown, including a field label 401 and a field data entry region 402. The user is presumed to have typed the first letter "J" corresponding to her name, and a pop-down, scrollable list 403 is immediately displayed with a list of possible choices for inserting into data entry area 402. As explained previously, these choices can be determined and displayed according to various heuristics.

A corner resizing tab 405 can be used to expand the displayable area of the list beyond the three choices shown in FIG. 4A. The user can scroll down through the list using an up/down arrow or mouse, and can select the suggested or highlighted choice by pressing a key such as the tab key or the return key. Additionally, a checkbox 404 allows the user to change the default decision as to whether this field should be stored for future use. In this manner, the user can choose to have certain fields stored for future use on a field-by-field basis. As one example, the user may prefer to prevent his or her telephone number from being stored for future use, while allowing his name, address, and e-mail address to be stored for future use.

In one embodiment, drop-down list 403 appears after the user enters the first character of a data value in form data area 402. The user will then have the opportunity to review the possible choices, which may be limited to previously used values for that field that begin with the same character. Alternatively, instead of typing the first letter, the user can press the "down" arrow key, which will cause the pop-down list to appear with suggestions for that field. With this approach, the user can, for example, fill out a zip code field without typing a single number (i.e., merely hitting the down arrow key will cause a list with the person's previously used zip code to appear). In one embodiment, the pop-down list feature may be limited to single-line edit boxes to prevent matching on such fields as e-mail messages.

Various methods of navigating through the list are also possible. The user can begin typing, causing the list to be narrowed down to those choices that continue to match the succeeding characters entered. Alternatively, the user can click the down arrow to view a list of all likely choices for that particular field. Another approach is to display the pop-down list if the user clicks on the field entry area 402 with the mouse. Once the list is shown, the user can use the mouse to select an entry or use the arrow keys to navigate through the list. To select the item from the keyboard, the user can hit return or tab. The tab key can also be used to advance to the next field. Once the user has finished the form, hitting return while in a field data entry area box will submit the form and store any form values entered for future use.

The escape key can be used to make the drop-down list disappear (if it is shown) and clear any values in the data entry field. Hitting the escape key while the cursor is in the data entry area can delete the text, or the delete key (or backspace key) can be used to erase one character at a time. Using the delete/backspace keys can cause the list to update as the user types, since the text in the field changes.

Various methods of controlling the drop-down list and specifying choices are possible, with the following illustrating one method of displaying and controlling the various choices in the drop-down list:

| USER ACTION | CURSOR IN DATA ENTRY AREA, NO DROP-DOWN SHOWING | CURSOR IN DATA ENTRY AREA, DROP-DOWN SHOWING | CURSOR IN DROP-DOWN LIST |
|---|---|---|---|
| TAB | advances to next field | advances to next field | selects item, advances to next field |
| DOWN ARROW | displays drop-down list | moves cursor into drop-down list | moves down through list of choices |
| RETURN | submits the form and stores any entered values | submits the form and stores any entered values | selects item from list, returns cursor to data entry area, closes drop-down |
| ESCAPE | deletes text from data entry area | drop-down disappears | drop-down disappears; cursor returns to data entry area |
| DELETE | deletes one character from data entry area | deletes one character from data entry area | deletes selected entry from list permanently |

It may be desirable to provide indications to the user that the suggested choices are retrieved from the user's own computer rather than from the web sites visited. To that end, displaying a checkbox 404 (FIG. 4A), indicating that it is the Internet browser that is storing this field, can help reinforce this message.

Figure 4B:
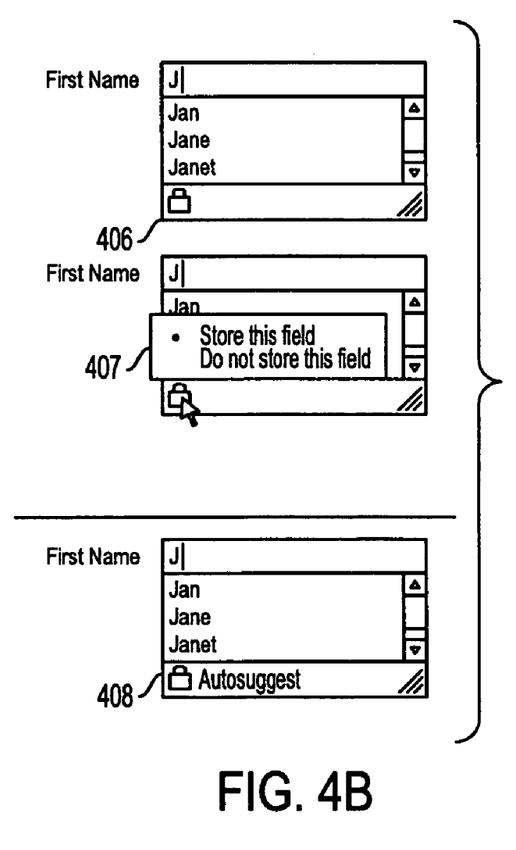
FIG. 4B shows a second technique for displaying a list of choices for a field data value and selecting one of the displayed choices.

FIG. 4B shows a slightly different variation on the approach discussed above. As seen in FIG. 4B, a padlock display item 406 is shown at the bottom of the drop-down list. When the user clicks on this padlock, a choice bar 407 pops into view, permitting the user to affirmatively indicate that the values in this field should be stored or not stored. Thereafter, the word "Autosuggest" can be displayed in area 408 as a reminder that data values for this field are being stored for future use.

Figure 4C:
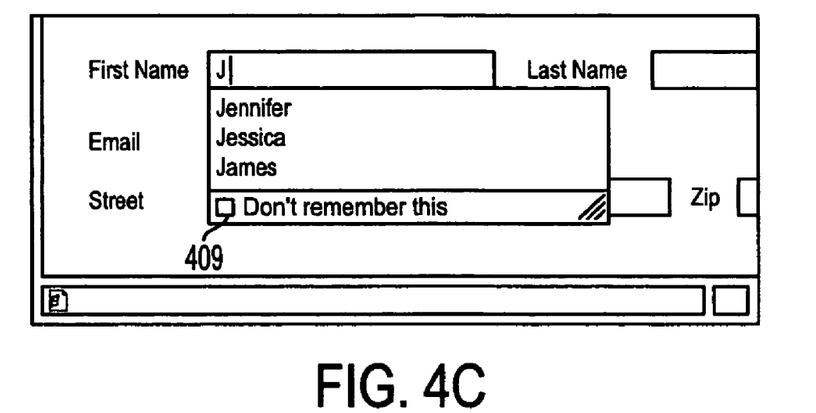
FIG. 4C shows a third technique for displaying a list of choices for a field data value and selecting one of the displayed choices.

FIG. 4C shows yet another variation on this approach, which includes a checkbox 409 permitting the user to affirmatively indicate that the values for the field should not be remembered for future use. In this manner, the user can selectively indicate that certain fields (e.g., passwords, telephone numbers, and the like) should not be stored for future use, while other more general information (e.g., name, address, and the like) can be stored for future use.

Figure 4D:
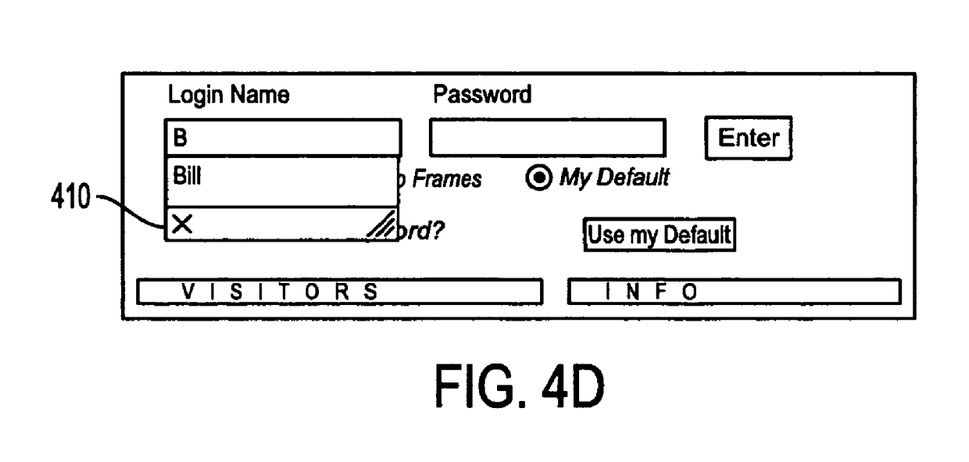
FIG. 4D shows a fourth technique for displaying a list of choices for a field data value and selecting one of the displayed choices.

FIG. 4D shows yet another variation on the foregoing approaches. As shown in FIG. 4D, a special "X" indicator is displayed at the bottom of the drop-down list. Clicking on this "X" causes the drop-down list to disappear.

A function can be provided which permits the user to delete items from the list of suggestions. For example, if the user types in "J", a suggestion list of "Jane", "John", and "Joe" might appear. If the user highlights and deletes "John", that choice would not longer appear on the list of suggestions.

Figure 5A:
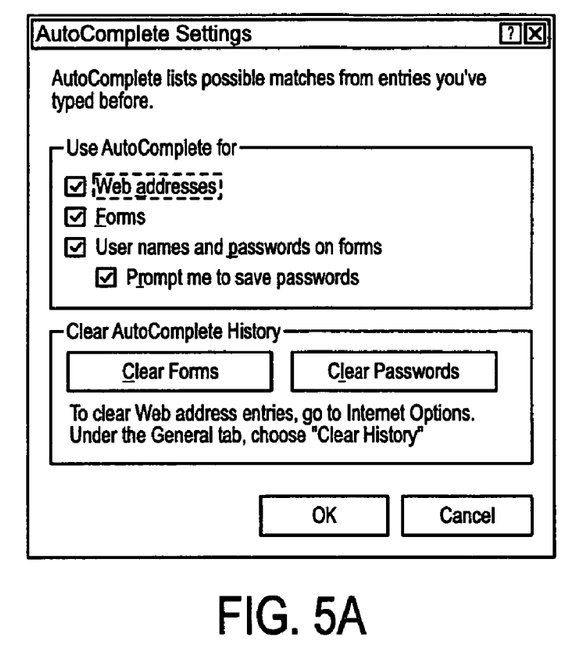
FIG. 5A shows one possible technique for providing options that permit a user to specify which data values should be suggested and stored.
Figure 5B:
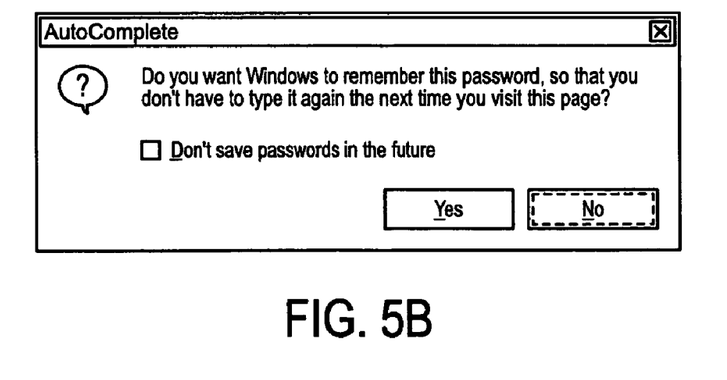
FIG. 5B shows one possible technique for prompting a user with an option to automatically remember a password for a future form.

FIG. 5A shows one possible approach for setting options in a web browser, so that the user can control at a global level the situations in which field values will be automatically suggested. As shown in FIG. 5A, the user can indicate that he or she should be prompted before saving passwords. FIG. 5B shows another variation on this approach which allows the user to specify that passwords should be treated in a special manner. Providing the user with advance warning of this feature can help alleviate any concerns that the values are being surreptitiously stored by web site operators.

The order in which entries are displayed in a pop-down list can be varied as desired. For example, if there is a previously stored field identifier that exactly matches a field on a form that the user is currently viewing, any data value associated with the previously stored field identifier can be suggested as a first choice. (If multiple data values are stored, they can be matched by URL, such that values from a previously visited web site would be displayed first). Alternatively, if a field identifier is not found in any previously stored data, the field identifier can be compared to one of a predetermined set of "common names" (e.g., name, address, telephone, phone, or similar subcombinations thereof such as addr) for which a known value exists. Similarly, a field identifier can be compared to a user profile stored on the client computer to find a match.

Another possible approach is to increment a one-up counter every time a previously stored field value is re-used, such that if there are several possible choices for a field, values will be suggested in the order of most frequent use. Alternatively, field values can be suggested in order of most-recently-used values.

Figure 6:
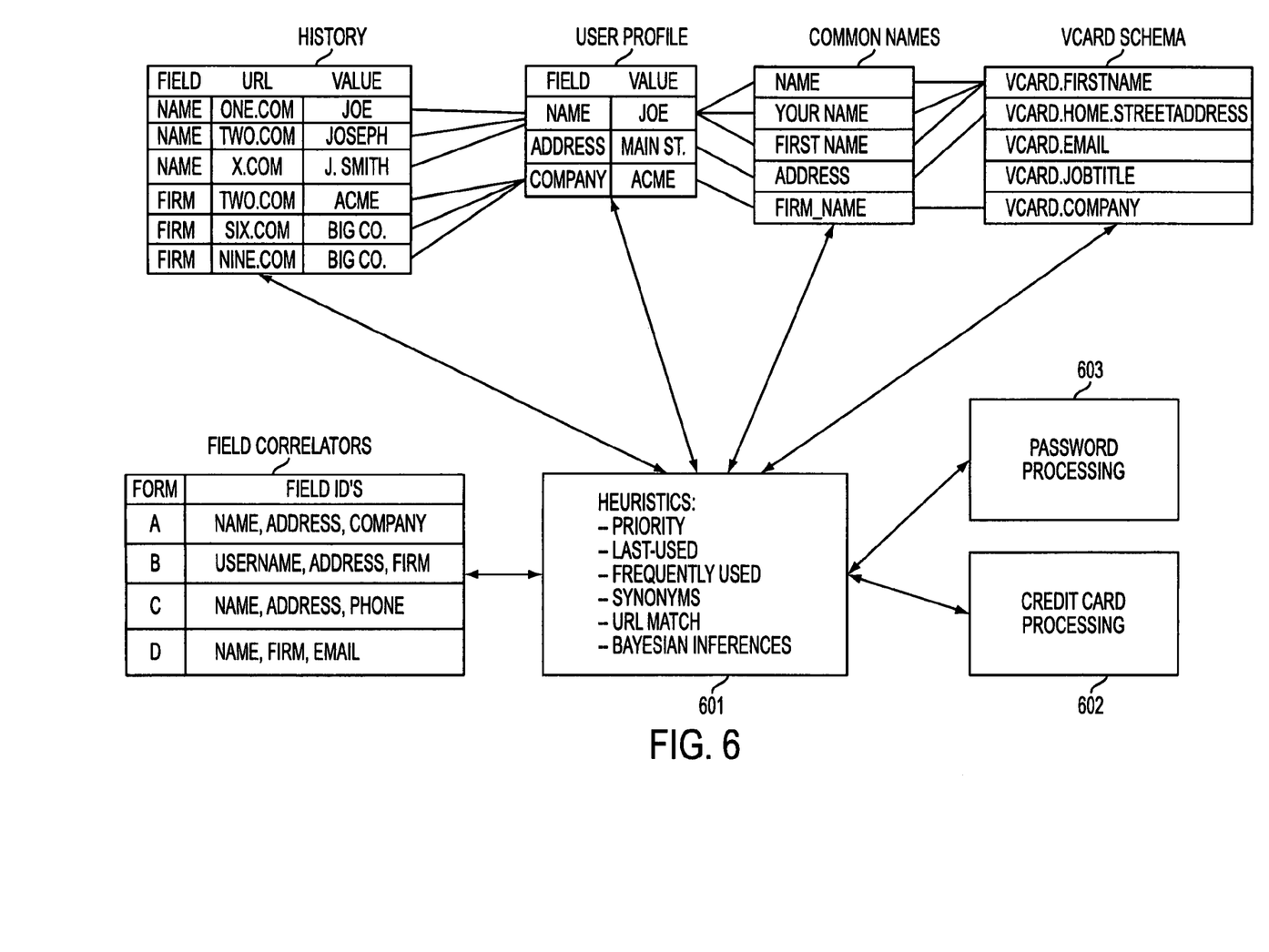
FIG. 6 shows various sources of information from which previously stored data values can be retrieved and mapped.

FIG. 6 shows various ways of suggesting field values based on previously stored values, including static and heuristically determined field mappings. As shown in FIG. 6, a heuristics function 601 (corresponding to heuristics function 206b of FIG. 2) is coupled to various data stores including history file HISTORY, a user profile file USER PROFILE, common names file COMMON NAMES, vCard schema file VCARD SCHEMA, and a field correlators file FIELD CORRELATORS. Additionally, a password processing function 603 and credit card processing function 602 can be provided.

In FIG. 6, history file HISTORY contains previously stored field identifiers, URLs, and field values for fields that the user previously entered. For example, as shown in FIG. 6, the user has entered values for two different fields ("name" and "firm") across six different web sites. When the user visits web site one.com for a second time and encounters a form having a field identifier of "name", the user can now be prompted with the suggestion of "Joe" for that field. Additionally, because the same field identifier was used (with slightly different values of "Joseph" and "J. Smith") at two other web sites, those values could also be suggested to the user.

Similarly, when the user visits a new web site not previously visited, any fields on that site having field identifiers of "name" or "firm" could be associated with the stored values from the earlier visited web sites, and heuristics function 601 could suggest any of the values previously stored from those web sites. Where multiple values were previously stored, they can be displayed in order of most-frequently-used, last-used, alphabetical, or any other order.

Additionally, where an exact match is not available, synonyms or close matches can be provided. Thus, for example, if a field identified as "username" is encountered, heuristics function 601 can determine that the field is similar to field identifier "name" in HISTORY, and the previously entered values for that field can thus be suggested. After the user selects a suggested value or enters a new value, history file HISTORY is updated to reflect the new information. (If the user had selected "do not store" for that field, however, this function would be bypassed).

The principles of the present invention can be implemented in conjunction with many different types of field information, including previously stored USER PROFILE information (such as might have been previously entered using the profile assistant); commonly used names file COMMON NAMES (e.g., a list based on commonly used field identifiers found on Internet web pages); and the conventional VCARD SCHEMA, which identifies specific fields that conform to the vCard standard. (The vCard field identifiers in FIG. 6 differ slightly from those in the prior art vCard convention in that more descriptive string identifiers are mapped to the vCard fields. For example, vCard string "fn" is mapped to "vCard.FirstName" as the corresponding HTML input field name identifier.) Heuristics function 601 can specify one or more of these data sources from which suggested field values will be retrieved, and can store new values in some of these data sources. The data sources illustrated in FIG. 6 are intended to be illustrative only. Many different sources of data can be used, and the structure and arrangement of the data can vary without departing from the principles of the invention.

As shown in FIG. 6, various mappings between field identifiers can be established statically and/or dynamically by heuristics function 601 as a user fills out forms over time. For example, COMMON NAMES may include three commonly used field identifiers for a user's name: "name", "your name", and "first name." All of these values can be statically mapped to VCARD SCHEMA field identifier "vcard.firstname," and to USER PROFILE field identifier "name", so that when any one of these field identifiers is encountered, all of the values associated with any of them can be automatically suggested. Thus, for example, a form that contains a field identifier "vcard.firstname" would be mapped to fields "name", "yourname", and "firstname" in COMMON NAMES, which would also be mapped to USER PROFILE field identifier "name" (which would suggest the value "Joe"). Additionally, because field identifier "name" in USER PROFILE is identical to three field identifiers contained in HISTORY, the values "Joe", Joseph", and "J. Smith" could also be suggested. (It may be desirable to eliminate duplicate choices "Joe" from the list). Consequently, a web site that generated a form with a field identified as the standard vCard.FirstName would cause a pop-down list to suggest "Joe", "Joseph", and "J. Smith" to the user, even though that web site had no prior knowledge of any of these prior values.

Similarly, a web site that generates a form with the field identifier "firm_name" would generate a pop-down list automatically suggesting previously used values "Acme" and "Big Co." in HISTORY as follows: "firm_name" appears in COMMON NAMES, and is statically linked to field identifier "company" in USER PROFILE, which contains value "Acme" and is also linked to three fields in HISTORY. The linkages between field identifier "firm" in HISTORY and the field identifier "company" in USER PROFILE (and thereafter to "firm_name" in COMMON NAMES) could be created by noting that the value "ACME" appears as a field value in both files. Alternatively, the linkages could be determined by noting that the field identifier "firm" in HISTORY is similar to the field identifier "firm_name" in COMMON NAMES.

In one embodiment, heuristics function 601 suggests a previously used value based on priority of data source. In this embodiment, a high priority can be associated with file HISTORY, such that a field identifier that matches a previously used field identifier appearing in the history file is suggested first. Different priority levels can be associated with the other data stores, so that matches from those files can be suggested if there are no matches at the higher priority levels. Alternatively, all possible matches can be suggested from any of the data files, arranged in priority order. Where multiple matches exist in HISTORY, a previously stored field value that is from the same URL would normally be suggested as a first choice over matches from different URLs.

Few web sites currently use the vCard schema, and it is unlikely that all text boxes on most web sites can be easily changed to refer to the vCard fields. In order to achieve various benefits of the invention while minimizing the effort involved, an additional attribute can be added to the input tag for a form field to identify the field as follows:
<input type="text" name="email" VCARD_NAME="vCard.email">

In this manner, the site can simply add the VCARD_NAME attribute to gain the functionality of the present invention without re-coding. For example, assume an existing form has an input field <input type="text" name="email">. One way to exploit the automatic suggestion feature would be to change the coding of the input field to: <input type="text" name="vCard.email">. Unfortunately, this change may also require changes to script on the page and on the server, which assumes that the field is still named "email". One variation of the inventive approach introduces a new attribute VCARD_NAME which allows the author to explicitly express the mapping of the field to the standard vCard naming without requiring recoding of logic that depends on the "name" attribute. In effect, the VCARD attribute provides a "union" function, so that the set of possible completion values can come not only from the set of values previously stored for the field, but also from an explicit set of values reference by the attribute. Two fields that have different names can be "forced" to be correlated for suggestion purposes by adding the same vCard attribute to each of them.

Field values can also be associated across different fields by context through the use of data file FIELD CORRELATORS. For example, if a user fills out an on-line catalog order specifying his name, address, and zip code on a single form, an indicator can be set indicating that those values are probably related (i.e., they were supplied on the same form). As shown in FIG. 6, for example, form "A" from a first web site included field identifiers "name," "address", and "company", suggesting that these fields were related in some context. A different form "B" at a second web site included field identifiers "username", "address", and "firm", suggesting that those fields were related in another context. Upon visiting a third site containing one of these fields, heuristics function 601 can search through file FIELD CORRELATORS for a similar context in order to provide previously used values. The basic idea is to extend the "union" function by clustering known common field names.

One technique for correlating field identifiers to previously used field values is through the use of Bayesian inference techniques. The well-known Bayes' theorem states that the probability that an event A occurs given that another event B has already occurred is equal to the probability that the event B occurs given that A has already occurred multiplied by the probability of occurrence of event A and divided by the probability of occurrence of event B. Using such techniques, inferences can be drawn regarding fields that frequency appear together on a form. As one example, suppose that field identifiers for username, password, and e-mail fields frequently appear together on a form, and generally appear in that relative order on a web page. (This can be detected either automatically or pre-set by a human programmer). Then, suppose that a new form is presented that contains field identifiers "username", "password", and "mail." Using Bayesian techniques, one could infer that the third field "mail" is the same as the e-mail field on the other forms, and could suggest previously used e-mail values for the "mail" field.

There are many different ways of storing previously used field values and mappings among values. When a form is submitted to a web site, the field identifier, time, and field value can be stored, indexed by the field identifier. A secondary data store, indexed by URL, can also be updated. The data store is preferably encrypted and stored in a protected area on the client computer. In addition to those files shown in FIG. 6, data regarding field names can be extracted from an address book maintained by the operating system (containing user registration information); from a "wallet" data store that contains address, name, and credit card information for user; or a "passport" data store that contains information on the user's country, postal code, date of birth, gender, passport number, photograph, nickname, occupation, and the like.

As with any feature that "remembers" user input, there may be security issues to consider when implementing the principles of the invention. These include (1) ensuring that web sites can't collect the stored data values entered by the user; (2) making it difficult for outsiders to get at saved user data; and (3) ensuring that users will perceive that their data is secure.

As to the first issue, it may be desirable to ensure that any site will have no way to see the information stored. While the user will see the proposed choices in the pop-down list, it may be desirable to inhibit storage of any suggested values into the form field data entry region except as initiated by user action (i.e., pressing a key, hitting the down arrow, or clicking in the field). A second-click mechanism could also be provided whereby if the user clicks on a field once, the focus shifts to the field, and a second click shows all completions for what's in the field. (The second click would not be necessary if the field already had focus, such as if the tab key had been used). One benefit of this is that a user can fill in forms without ever touching a key on the keyboard, yet it still requires physical input so that a web site can't circumvent the feature.

Stored data can be encrypted and stored in protected storage. If the user is logged into the operating system, the user's password can be used to encrypt the data. If the user has not logged into the operating system, then a unique key per machine can be used to encrypt data in the protected storage area.

It may be desirable to avoid storing for later suggestion purely numeric data values, such as credit card numbers, PINs or account numbers (the latter examples are typically stored as text but represent numeric-only values). It is of course within the scope of the invention to suggest such values.

Several measures can be taken to ensure that users will perceive their data as secure. Administrators can restrict the use of the features through a browser administration configuration tool. Additionally, each user can be given a global choice to activate or deactivate the autosuggestion feature, so that field values are never stored when the feature is deactivated (see FIG. 5A). (In one embodiment, the user can be prompted when the user submits a form, via a dialog box asking the user whether the feature should be turned on or off). Additionally, as outlined above, the user can specify on a per-field basis whether values for that field should be stored for future use.

It may be desirable to provide web sites with a mechanism for disabling the autosuggestion feature via script. Some web sites, for example, may perceive it as detrimental to the operation of their web sites to have field values automatically suggested by a web browser. An attribute can be set aside to turn off the autosuggestion feature for a particular field or for an entire form (e.g., <INPUT name="first name" AUTOCOMPLETE="off">).

For security reasons, it may be desirable to avoid automatically storing fields containing numbers, except for those within the vCard schema or those common names mapped to the schema (e.g., zip codes, and telephone numbers). This is because there is a chance that a field could represent a credit card number, social security number, bank routing number, or the like. Numbers probably make up some of the most sensitive data the user enters in on the web.

Passwords may also require special attention, and can be handled by password processing function 603. In one embodiment, passwords can be suggested only after a known username is selected from the drop-down menu. Thus, it may be desirable to remember the login password of each username on a per-domain basis. The function would consider what fields exist on a form. If there were a regular edit field and a single password field, it is probably a login page. When the user enters a username and password, he can be prompted by the browser to store or not store the password (see FIG. 5B). The user could also be prompted once per URL per username/password. In other words, if a user visits a web site and enters a username/password, the user would be prompted to indicate whether that username/password should be stored for future use. The next time that user visits the same web site, he or she would not be prompted again. If a different user visits the same site and enters a different username/password, they would be prompted to indicate whether that username/password should be stored for future use.

In one embodiment, when a user selects a suggested item for a username field, password processing function 603 automatically and immediately fills in the associated password field with the password that was last used (and stored) with that username on that specific form. (The latter feature can also be implemented by associating the password value with the username without matching on the specific form). Requiring a match on the specific form (identified by the URL) can prevent an unscrupulous web site operator from stealing the user's password via a "trojan horse" attack; i.e., impersonating the legitimate site which requires a username and password and waiting for the user to fill in their username, which would thus fill in a passsword field (possibly hidden), which is then available to the imposter site. Matching on the specific form ensures that the password is automatically filled in only on the legitimate site. As described previously, it is contemplated (but not critical) that passwords are hidden with asterisks or the like, such that a list of passwords cannot be easily viewed. Due to security issues with remembering passwords, a preferred embodiment requires user confirmation before remembering and associating a password with a particular username and form.

In addition, a checkbox can be provided to avoid prompting again for this feature. The action that results from the various combinations of inputs are:

Yes, unchecked: Remember password for this login (based on URL) and ask again in the future about passwords.

No, unchecked: Do not remember password for this login (this is the default action), but ask again in the future.

Yes, checked: Remember password for this URL but don't show this window again.

No, checked: Do not remember and don't ask again. (However, any previously remembered passwords will still be filled in automatically)

Unless the user checks the "don't ask again" choice, the window will appear for each new login encountered. This includes a new user logging in to the same URL. For security reasons, it may be desirable to avoid having a "Yes to all" counterpart, since that would indicate that passwords are stored without warning, and unknowing users could compromise their passwords without even knowing it.

When passwords are changed, additional processing may be required. In one embodiment, software can detect when a different password has been entered for a username already in the database. The user will be prompted if they want this password changed via a dialog, such as: "The password you entered is different from the one previously stored; would you like the new password to be stored for future use?"

Additional precautions can be provided to protect passwords against "spoofing," such as might occur if a web site attempted to spoof a login page and extract a password after a user name is selected from the drop-down list. In one embodiment, a URL match is required, such that if the URL does not match, no passwords will be suggested. Additionally, passwords are preferably encrypted and stored in protected storage, such that someone with physical access to the machine cannot gain access to them. Moreover, when filling in a password from a suggestion list, it may be desirable to hide the password with asterisks or a similar mechanism.

A password can be stored in the name-indexed data store in pages where the user completes a field with the <input=password> tag. In addition to linking that password to an URL in the data store, the password can also be linked to form information in the base URL (i.e., in addition to storing form information for the page www.amazon.com/exec/obidos/order2/002-7097885-2828235, also link to the base URL, www.amazon.com/. These URLs may be accessed via a secure http address). That URL should be checked for passwords. Also, a check should be made to determine whether the user has decided not to save encrypted pages to the cache.

Where there are multiple users, it may be desirable to prevent one person from using another's passwords. One approach is to require each user to only remember a single password, and that password would give the user access to all the passwords they use while browsing the web. When a page is first loaded with a tag <input type=password>, a "login" dialog can be presented. Once the user has logged in, the user has been identified and all further data fields can be automatically suggested. When the user exits the browser, login information is lost and the user would need to log in again. A global login procedure could also be provided for the feature (e.g., explicitly login to the browser to turn on the feature).

Credit card information may also be subjected to special handling. A malicious web site could generate an input field with an innocuous name like "FirstName" while labeling it "Credit Card Number." An unknowing user may then enter their credit card number, which would then be saved and offered for autosuggestion whenever an input field named "FirstName" is encountered. This could critically affect the perceived privacy of the inventive principles. To prevent this, a checksum can be performed on field values that are integers. One possible checksum algorithm is as follows:

For a card with an even number of digits, double every odd numbered digit and subtract 9 if the product is greater than 9. Add up all the even digits as well as the doubled odd digits, and the result must be a multiple of 10 or it's not a valid card. If a card has an odd number of digits, perform the same addition, doubling the even numbered digits instead.

Since cards can have varying numbers of digits (i.e. Visa has 13 or 16, Amex 15, and MC 16), the fields can be filtered on a minimum of 10 digits. This will prevent the software from catching zip codes with the checksum. If the field value is a credit card number, then storage of the field for future use can be suppressed.

The foregoing explanation includes many variations and embodiments, and the invention is not intended to be limited to the specific details disclosed herein. Consequently, the invention is limited only by the claims appended hereto.

The invention claimed is:

1. A computer-implemented method of entering information, comprising the steps of:
   (1) displaying on a computer screen a form comprising a plurality of fields, each field having a field identifier and a data entry region into which a data value can be written;
   (2) determining that a user has selected one of the plurality of fields;
   (3) comparing the field identifier of the selected field to previously stored field identifiers and, upon finding a match, displaying a list of suggested data values previously stored in response to one or more different forms previously filled in by the user;
   (4) in response to the user selecting one of the suggested data values, copying the selected one data value into the data entry region of the selected field; and
   (5) in response to the user entering a non-suggested data value, storing the non-suggested data value into a data storage area for future use,
   further comprising the step of performing numerical processing on the field to determine whether the field represents a credit card number and, in response thereto, suppressing suggestions.

2. A computer-implemented method of entering information at a user's computer, comprising the steps of:
   (1) displaying on the user's computer a first form comprising a first plurality of text fields each comprising a field identifier and a data entry region into which a data value can be written;
   (2) entering a data value into one of the first plurality of text fields and storing the entered data value into a local storage area on the user's computer;
   (3) displaying on the user's computer a second form comprising a second plurality of text fields each comprising a field identifier and a data entry region into which a data value can be written, wherein the second plurality of text fields comprise field identifiers that are different from those in the first form;
   (4) detecting that one of the text fields on the second form is correlated with one of the text fields on the first form despite having a different field identifier, said detecting comprising the use of Bayesian inference techniques, and, in response thereto, retrieving a corresponding previously stored data value from the local storage area; and
   (5) suggesting the data value retrieved in step (4) to the user as a possible value to be entered into the second form.

3. A computer-readable medium having computer-executable instructions for performing steps comprising:
   (1) displaying on a computer screen a form comprising a plurality of fields, each field having a field identifier and a data entry region into which a data value can be written;

(2) determining that a user has selected one of the plurality of fields;
(3) comparing the field identifier of the selected field to previously stored field identifiers and, upon finding a match, displaying a list of suggested data values previously stored in response to one or more different forms previously filled in by the user;
(4) in response to the user selecting one of the suggested data values, copying the selected one data value into the data entry region of the selected field; and
(5) in response to the user entering a non-suggested data value, storing the non-suggested data value into a data storage area for future use, wherein the computer-executable instructions perform the step of performing numerical processing on the field to determine whether the field represents a valid credit card number and, in response thereto, inhibiting suggestions for the field.

* * * * *